UNITED STATES PATENT OFFICE.

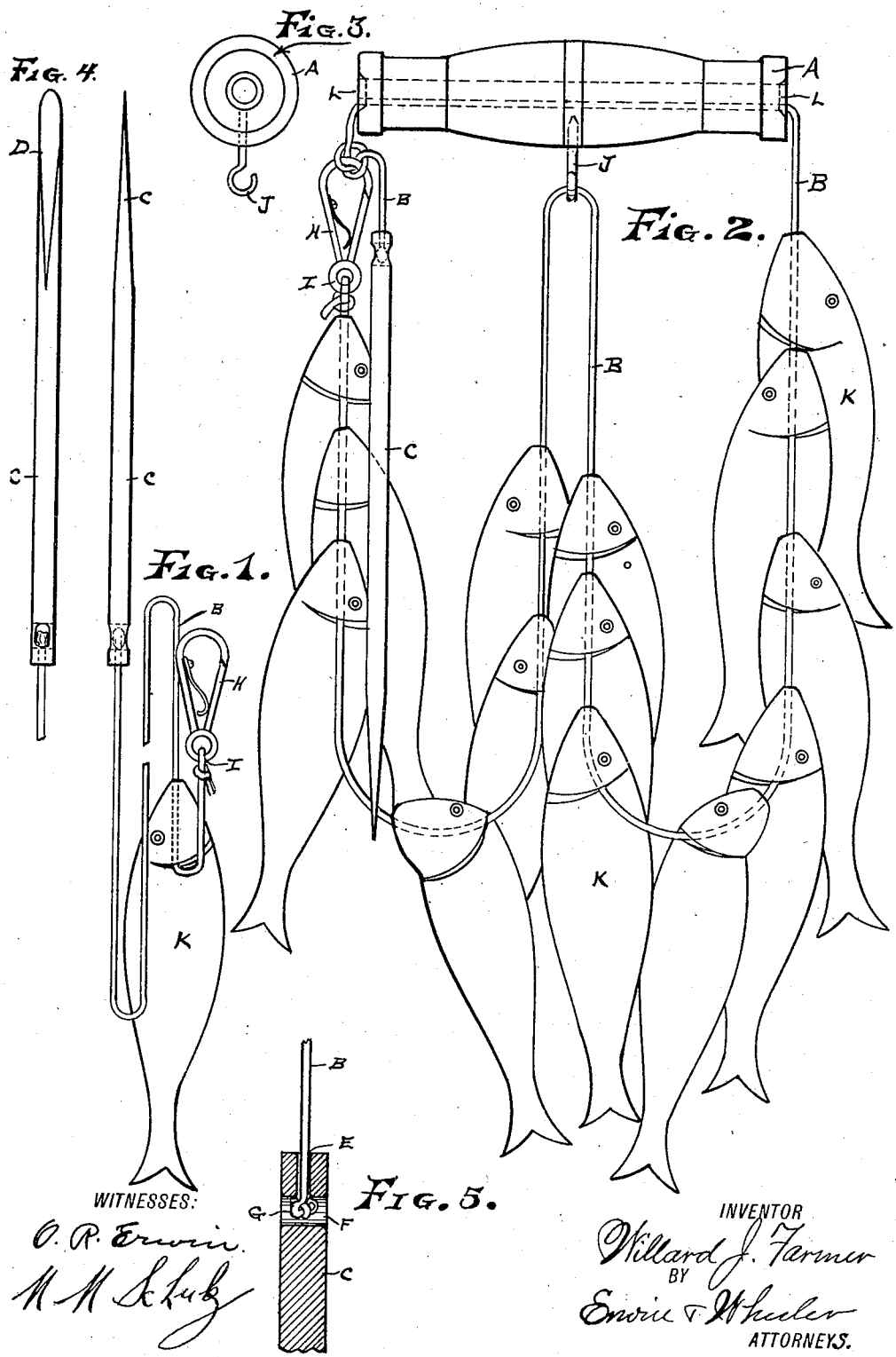

WILLARD J. FARMER, OF MILWAUKEE, WISCONSIN.

FISH STRINGER AND CARRIER.

No. 827,855.　　　　　　Specification of Letters Patent.　　　　　Patented Aug. 7, 1906.

Application filed October 16, 1905. Serial No. 282,946.

*To all whom it may concern:*

Be it known that I, WILLARD J. FARMER, a citizen of the United States, residing at the city of Milwaukee, county of Milwaukee, and State of Wisconsin, have invented new and useful Improvements in Fish Stringers and Carriers, of which the following is a specification.

The object of my invention is, first, to provide a device by which a fish may be readily and quickly placed upon a suspension-cord; second, to provide means by which a long cord from which a number of fish are suspended may be so folded and connected with the carrying-handle that the lower end of a string of fish will not when carried trail upon the ground.

My invention pertains, first, to the construction of the needle; second, to the device for securing the end of a cord thereto, and, third, to the combination of the needle, cord, and handle.

My invention is explained by reference to the accompanying drawings, in which—

Figure 1 represents a cord one end of which is attached to the needle and the other to a fish, the needle being shown in side elevation. Fig. 2 represents the suspension-cord in connection with a carrying-handle and a string of fish. Fig. 3 represents an end view of the carrying-handle. Fig. 4 represents a front elevation of the needle illustrated in Fig. 1. Fig. 5 represents a longitudinal section of the needle, showing the manner of securing the knot of the suspension-cord in the eye of the needle.

Like parts are identified by the same reference-letters throughout the several views.

A represents the handle, from which the cord B is suspended.

C represents the needle, which is preferably provided with a flat point, the flattened surface of which is shown at D in Fig. 4. The eye of the needle is made by forming a longitudinal aperture E in the large end of the needle and a transverse aperture F communicating through the sides of the needle with the longitudinal aperture E. When threading the needle, it is first inserted through the longitudinal aperture E and out through one side of the aperture F, when a knot G is formed in the end of the cord. When the end of the cord is drawn into the aperture F and is retained by said knot G against the inner end of the aperture E, it is obvious that the end of the cord when so inserted is brought entirely within the circle described by the circumference of the needle, and the needle is thereby readily drawn through the gills of a fish and is not obstructed in its passage by the cord. It will of course be obvious that a needle thus formed may be used in connection with cord or thread for any other purpose.

H is a snap-hook of ordinary construction which is attached to the opposite end of the cord B from that of the needle by a knot I in the ordinary manner.

I preferably provide the center of the handle A with a hook J, from which the center of the cord B is suspended, as indicated in Fig. 2, whereby when the cord is filled with a number of fish, the central part of the cord A may be looped upon said hook J, and the liability of the string of fish trailing when carried by the handle is avoided.

In using my device I preferably remove the cord B from the handle when attaching the fish K thereto, as indicated in Fig. 1. When this is done, the other fish are successively strung upon the cord B by passing them over the needle C. When the desired number of fish have thus been strung upon a cord, the needle is inserted through the longitudinal aperture L of the handle, when the lower end of the string to which the fish K is attached is drawn upwardly, and the snap H is secured to the opposite end of the cord near the needle, as indicated in Fig. 2. This being done, the central portion of the cord is drawn upwardly and looped over the free end of the hook J, when a string of fish is suspended and readily carried by the handle, as previously stated and described.

While the needle C is especially adapted to be used in connection with a cord for stringing fish, it is obvious that the same may, if desired, be used for other purposes.

Having thus described my invention, what I claim as new, and desire to secure by Letters Patent, is—

1. The combination of a cord; a needle secured to one end thereof; a snap-hook secured to the opposite end thereof; and a handle slidably secured to said cord at an intermediate point between its respective ends, substantially as set forth.

2. The combination of a cord; a needle secured to one end thereof; a snap-hook secured to the opposite end thereof; a handle slidably secured to said cord at an intermediate point between its respective ends; and a cord-suspending hook secured to the center of said handle, all substantially as and for the purpose specified.

In testimony whereof I affix my signature in the presence of two witnesses.

WILLARD J. FARMER.

Witnesses:
 JAS. B. ERWIN,
 O. R. ERWIN.